Nov. 21, 1967  R. STOCKMAN  3,353,919
APPARATUS FOR THE ELIMINATION OF ODORS FROM NOXIOUS GASES
Filed July 23, 1964
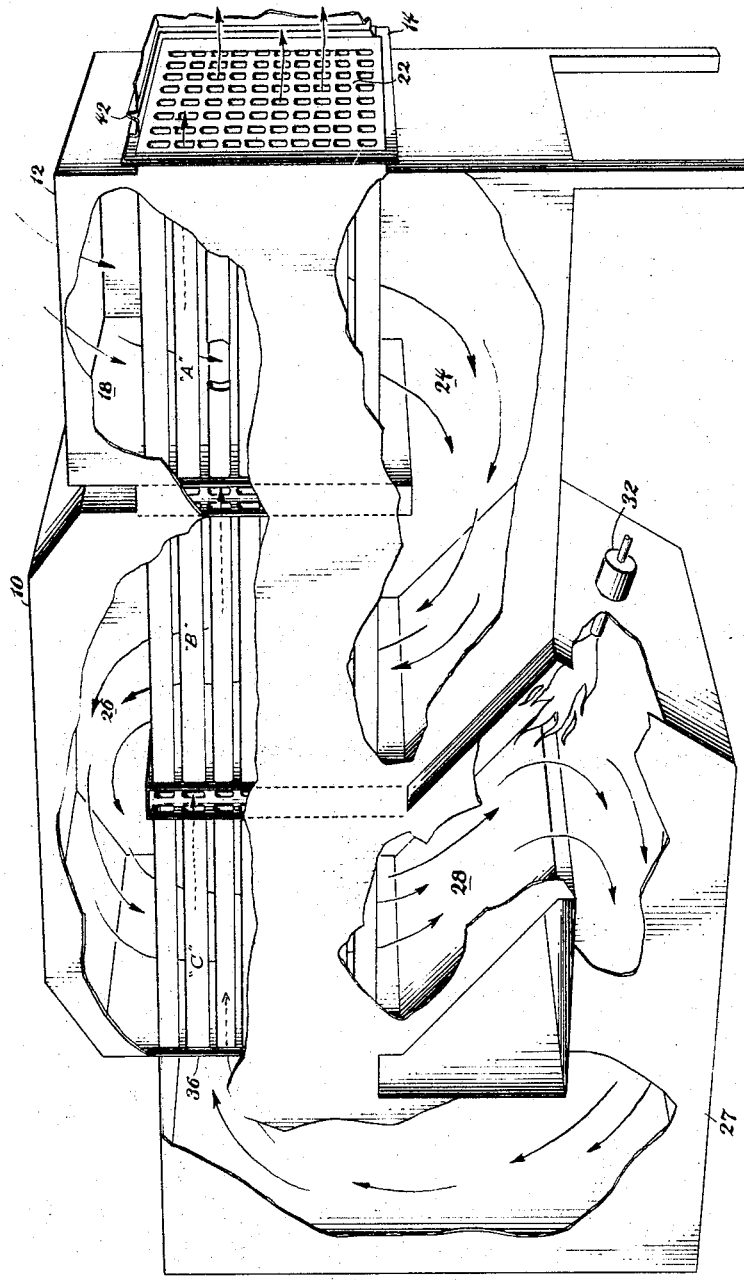
INVENTOR.
Richard Stockman
BY
Wayne Lang
AGENT

United States Patent Office 3,353,919
Patented Nov. 21, 1967

3,353,919
APPARATUS FOR THE ELIMINATION OF ODORS FROM NOXIOUS GASES
Richard Stockman, Friendship, N.Y., assignor, by mesne assignments, to The Air Preheater Company, Inc., a corporation of Delaware
Filed July 23, 1964, Ser. No. 384,592
2 Claims. (Cl. 23—277)

This invention relates to heat exchange apparatus and particularly to such apparatus as may be used in an arrangement that effects the removal of odors from gases by heating them to a predetermined elevated temperature. The presence of noxious vapors in gases exhausting from various industrial processes frequently creates a public nuisance when such gases are exhausted directly into the atmosphere. Not only is the odor of the noxious gases offensive but under conditions that may vary considerably with the process involved, the noxious vapors may be physically harmful to life and property.

It has been discovered that in many instances the objectionable characteristic of these gases is due to the presence of volatile combustible constituents, and that such constituents may frequently be dissipated entirely by heating the gases to a predetermined elevated temperature at which they are more completely oxidized.

Inasmuch as the temperature required to dissipate the odors in noxious gases may well lie in the range of 1100° F. to 1500° F. it is apparent that the broad use of this process depends upon the efficiency with which the process may be effected and the economic justification of the process involved.

It is therefore the primary object of this invention to provide apparatus which will effectively dissipate the noxious fumes in exhaust gases from boiler furnaces or from any of various industrial processing operations.

Another object of this invention is to provide an arrangement of apparatus for the elimination of noxious fumes that is efficient in operation and economical to manufacture and operate.

A still further object of this invention is to provide an arrangement of apparatus for the elimination of noxious fumes that may be adapted to occupy a single compact housing.

For a more thorough understanding of the invention with reference to the manner by which the aforesaid objects are achieved reference may be had to the drawing in which the single figure is a perspective view of the apparatus that comprises the invention.

In the drawings the numeral 10 designates a particular housing structure having an inlet 12 for the entrance of a noxious gas and an outlet 14 for the exhaust therefrom of a relatively pure or odor-free gas. Within the housing 10 is located a heat exchange apparatus having an entrance chamber 18 that coincides with the inlet 12 of the housing and an outlet 22 that coincides with the housing port 14. The heat exchange apparatus preferably comprises a multipass cross-flow unit in which gas from inlet 12 first flows over section A to housing chamber 24 where its direction of flow is reversed back over section B to housing chamber 26. Housing section 26 again directs the gas flowing thereto downward over the tubes of section C to the housing duct 28. For economy and simplification of manufacturing procedures the sides 27 of the duct 28 are preferably formed continuous with the housing 10 into a single integrated structure.

Gas entering the housing duct 28 is subjected to the direct heating action of a combustor 32. The combustor is positioned adjacent the outlet from section C of the heat exchanger and is preferably directed in opposition to the direction of gas flow in order that the gas will be thoroughly agitated and mixed by the turbulence of the combustor, and the period of contact between the gas from section C and the heat of the combustor will accordingly be increased. Furthermore the duct 28 is formed to a total length that permits the heated gas from the combustor to hold its elevated temperature for a period of time required for the substantially complete oxidation of the unoxidized gases. Thus, during the passage of the gas through duct 28 it is heated to a temperature ranging from 1100° F. to 1500° F. and is rendered free of all noxious odors.

After entering the inlet 36 for passage through the tubular members of section C, the heated odor-free gas gives up some heat to the noxious gas from chamber 26. Then as the odor-free gas passes serially through sections B and A it continues to progressively give up heat to the noxious gas from inlet 12 until it is exhausted through outlet 22 as a substantially cool and odor-free gas only slightly higher in temperature than that of the noxious gas being directed through inlet 12.

To preclude excessive loss of heat through the walls of housing 10, the walls may be covered with a coating of suitable insulation material not here illustrated. Thus the transfer of heat is limited to the gases within the system and little heat is permitted to be conducted through the walls and lost to the system.

If the fume eliminator is to be an element of a larger system requiring additional apparatus including ductwork to the inlet 12 and outlet 14, suitable expansion joints 42 may be provided to permit limited expansion and contraction of the related parts without causing a spatial unbalance of the entire system.

While this invention has been described with reference to the embodiment illustrated in the drawing, it is evident that numerous changes may be made without departing from the spirit of the invention. It is therefore intended that all matter contained in the above description or shown in the accompanying drawing shall be interpreted as illustrative and not in a limiting sense.

I claim:
1. Apparatus for the purification of a noxious gas comprising in combination a housing having inlet means for a noxious gas and outlet means for a purified gas, a heat exchanger in said housing having inlet and outlet ports for the noxious gas and inlet and outlet ports for the purified gas, said inlet means for the noxious gas arranged to coincide with the inlet port for the noxious gas and the outlet means for the purified gas arranged to coincide with the outlet port for the purified gas, duct means within said housing connecting the inlet port for purified gas to the outlet port for noxious gas, and a combustor in said duct means arranged to direct hot gases exhausting therefrom in opposition to the flow of noxious gases from said outlet port to provide optimum mixing of the noxious gases and hot exhaust gases before they are introduced into the inlet port for the purified gas.

2. Apparatus for the purification of a noxious gas as defined in claim 1 wherein the apparatus adapted to heat the noxious gas flowing through said duct means increases its temperature to in excess of 1000° F.

References Cited

UNITED STATES PATENTS

| | | | |
|---|---|---|---|
| 3,090,675 | 5/1963 | Ruff et al. | 23—277 |
| 3,214,246 | 10/1965 | Ridgway | 23—277 |

JAMES H. TAYMAN, Jr., *Primary Examiner.*
MORRIS O. WOLK, *Examiner.*